(12) United States Patent
Colby

(10) Patent No.: US 10,273,805 B2
(45) Date of Patent: Apr. 30, 2019

(54) SPRING SUSPENSION CLIP

(71) Applicant: Graden Colby, Ridgeway, CO (US)

(72) Inventor: Graden Colby, Ridgeway, CO (US)

( * ) Notice: Subject to any disclaimer, the term of this patent is extended or adjusted under 35 U.S.C. 154(b) by 0 days.

(21) Appl. No.: 15/003,750

(22) Filed: Jan. 21, 2016

(65) Prior Publication Data

US 2017/0211385 A1     Jul. 27, 2017

(51) Int. Cl.
*E21D 20/00* (2006.01)
*E21D 21/00* (2006.01)
*F16B 2/24* (2006.01)
*F16M 13/02* (2006.01)
*E21D 20/02* (2006.01)

(52) U.S. Cl.
CPC ....... *E21D 21/008* (2013.01); *E21D 21/0093* (2013.01); *F16B 2/248* (2013.01); *F16M 13/022* (2013.01); *E21D 20/02* (2013.01)

(58) Field of Classification Search
CPC . E21D 21/0093; E21D 20/02; E21D 21/0006; E21D 21/0026; F16B 13/00; F16B 31/04; F16M 13/02
USPC ......... 267/166, 179, 134, 140.12; 405/259.1, 405/259.5
See application file for complete search history.

(56) References Cited

U.S. PATENT DOCUMENTS

| | | | | |
|---|---|---|---|---|
| 3,160,988 A | * | 12/1964 | Williams | E04B 1/4121 249/213 |
| 3,653,217 A | * | 4/1972 | Williams | E21D 20/021 405/259.3 |
| 3,942,329 A | * | 3/1976 | Babcock | E21D 21/0006 405/259.5 |
| 5,368,283 A | * | 11/1994 | Pavlin | F02D 11/04 267/155 |
| 5,378,087 A | * | 1/1995 | Locotos | E21D 11/006 405/259.5 |
| 5,417,521 A | * | 5/1995 | Scott | E21D 20/025 405/259.5 |
| 5,954,455 A | * | 9/1999 | Eaton | E21D 20/025 405/259.6 |
| 5,961,266 A | | 10/1999 | Tseng | |
| 6,260,833 B1 | * | 7/2001 | Drager | F16F 1/12 267/169 |
| 6,375,171 B1 | * | 4/2002 | Zimmermann | B25F 5/006 267/137 |
| 7,431,252 B2 | | 10/2008 | Birli | |
| 2003/0127787 A1 | * | 7/2003 | Konig | E04C 5/163 267/179 |

* cited by examiner

*Primary Examiner* — Todd M Epps

(57) ABSTRACT

A spring suspension clip configured to suspend a threaded rod member comprises a helical body with an upper end and a lower end, and a clipping section defined as the helical body. Then the clipping section is configured to conform to a threaded section of the threaded rod member to flexibly suspend the by two outward extensions into a space which is drilled and positioned within a section of rock which is to be grouted.

4 Claims, 4 Drawing Sheets

SPRING SUSPENSION CLIP

BACKGROUND

The positioning of threaded rods in place until its grouted has been practiced in different ways throughout the history of overhead rock grouting. Conventional methods include manual positioning where a person has to position the threaded rod in a predefined position by attaching the threaded rod to support sections that extend across the space in which the grout is to be pumped into. Other methods include threading on expandable heads, but it is not the best method as it is costly and expandable heads effectively restrict the grout pumped through them, and also if the hole is oversized, the assembly won't work well.

Hence, there is a long felt but unresolved need for a spring suspension clip configured to steadily clip a threaded rod, and to hold the rod in position until the grout is pumped in and facilitated to set.

SUMMARY OF THE INVENTION

The spring suspension clip described herein addresses the above mentioned need for a device which is configured to steadily clip a threaded rod, wherein the spring suspension clip can be easily clipped over the top of the threaded rod. A spring suspension clip configured to suspend a threaded rod member comprises a helical body with an upper end and a lower end. Then the clipping section is configured to conform to a threaded section of the threaded rod member to flexibly suspend the threaded rod member into a space which is drilled and positioned within a section of rock which is to be grouted.

In an embodiment, the clipping section is clipped at the top end of the threaded rod. In an embodiment, the threaded rod member is of an R32 grade threaded rod. In an embodiment, the grout is filled inside the space after suspending the threaded rod member in a predefined position within the space, and the grout is allowed to set within the space. In an embodiment, the height of the suspension of the threaded rod member can also be adjusted by rotating the spring suspension clip along the threaded section of the threaded rod member.

DETAILED DESCRIPTION OF THE INVENTION

Figure 1:
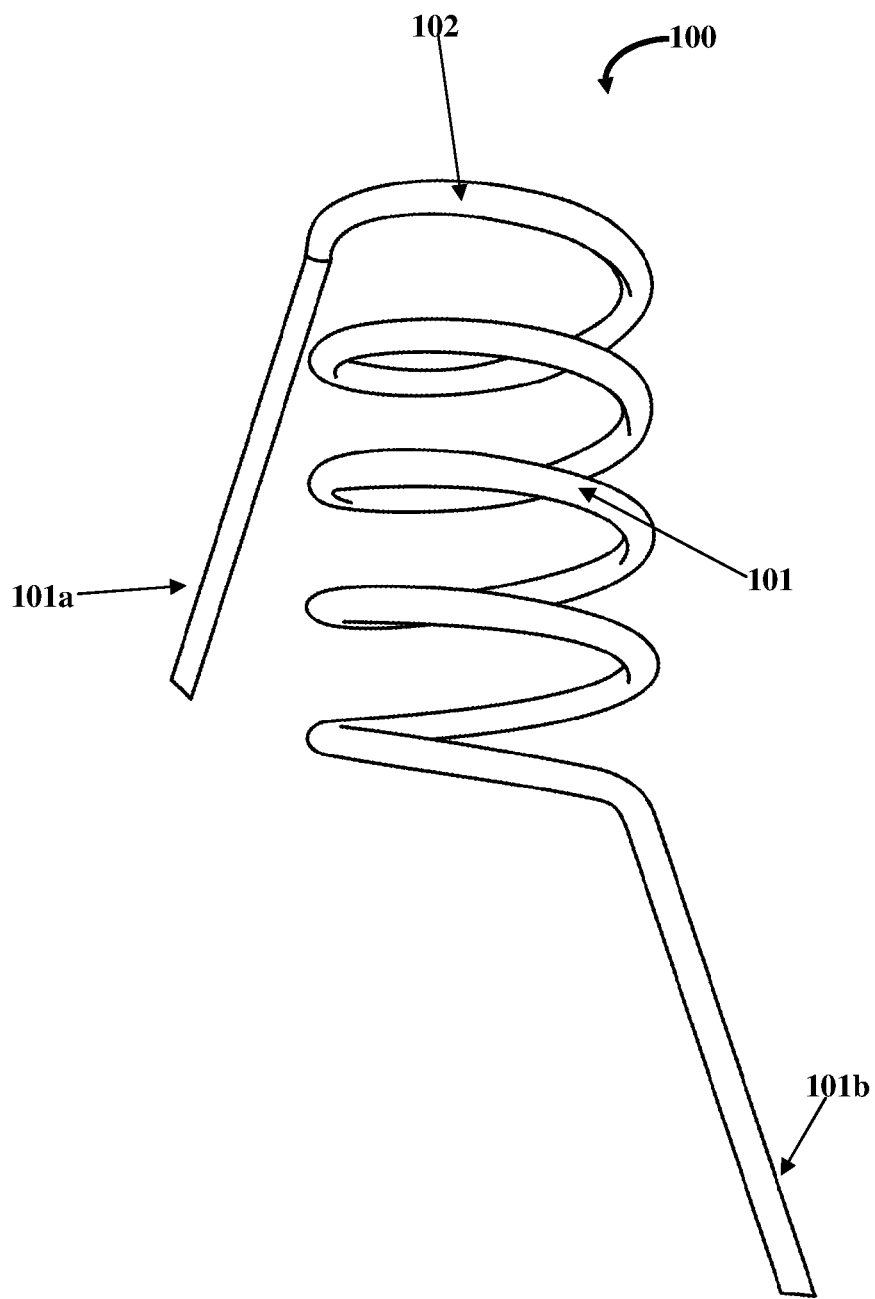
FIG. 1 exemplarily illustrates a front perspective view of the spring suspension clip.

FIG. 1 exemplarily illustrates a front perspective view of the spring suspension clip 100. The spring suspension clip 100 is configured to suspend a threaded rod member 105, where the spring suspension clip 100 comprises a helical body 101 with an upper end 101a and a lower end 101b. Then the clipping section 102 is defined as the helical body 101 is configured to conform to a threaded section 109 of the threaded rod member 105 to flexibly suspend the threaded rod member 105 within a space 104 which is drilled and positioned within a section of rock 106 which is to be grouted, as shown in FIG. 2. In an embodiment, the threaded rod member 105 is, for example, of an R32 grade threaded rod.

Figure 2A:
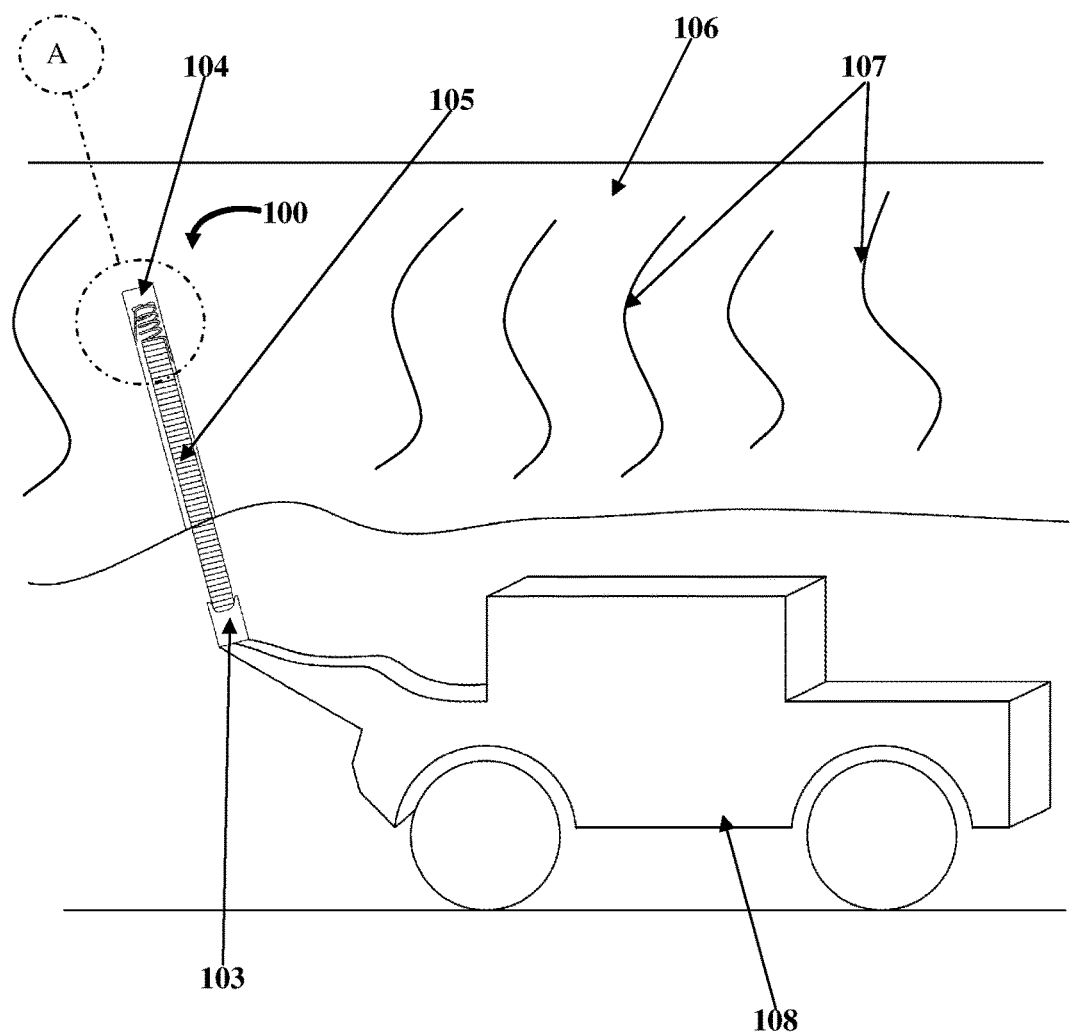
FIG. 2A illustrates a front perspective view of the spring suspension clip being used to suspend a threaded rod member which is positioned inside a space.
Figure 2B:
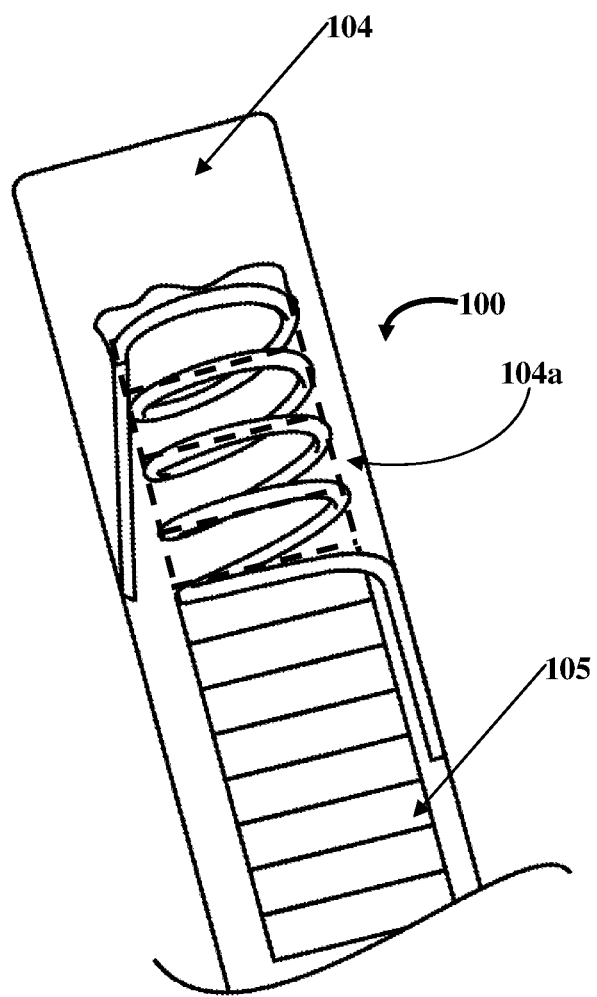
FIG. 2B illustrates an enlarged view of the portion marked A in FIG. 2A.

FIG. 2A illustrates a front perspective view, showing the spring suspension clip 100 used to suspend a threaded rod member 105 which is positioned inside a space 104, and FIG. 2B illustrates an enlarged view of the portion marked A in FIG. 2A. In an embodiment, the grout 107 is filled around the space 104 after suspending the threaded rod member 105 in a predefined position within the space 104, and the grout 107 is allowed to set around the space 104. In an embodiment, an opposing end of threaded rod member 105 is attached to a driver 103 of a rock bolter 108, as shown in FIG. 2A.

Figure 3:
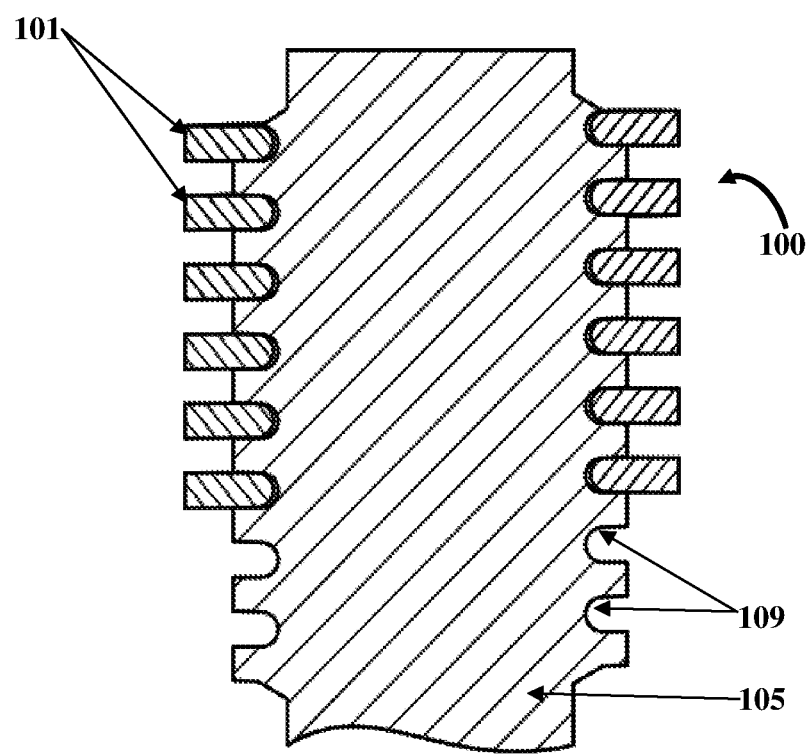
FIG. 3 illustrates a partial sectional view of the joint between the spring suspension clip and the threaded rod member.

A user first positions the driver 103 which is connected to a rock bolter 108 in alignment with the space 104, then the user connects the spring suspension clip 100 at the top end of the threaded rod member 105, and the threaded rod member 105 and the spring suspension clip 100 are inserted into the space 104. Now the threaded rod member 105 is threadably joined with the spring suspension clip 100 at a predetermined height as set by the user by rotating the spring suspension clip 100 along the threaded section 109 of the threaded rod member 105 as shown in FIG. 3. Now the user fills section of rock 106 around the space 104 with the grout 107 to set with the threaded rod member 105 positioned inside the space 104. The spring suspension clip 100 effectively grabs the threaded section 109 of the threaded rod member 105 and the two outwardly tailpieces will grab the sidewall 104a which defines the space 104 as shown in FIG. 2B. The spring suspension clip 100 is very clip to install, and can easily fit through the mechanical sleeve of rock bolter 108 carrousel. The helix body 101 has an upper or head end and a lower or tail end. The two outwardly tailpieces are called head and tail compressors. The head compressor extends axially, downwardly, and outwardly compressible from the head end of the helix body 101 and the tail compressor extends axially, downwardly, and outwardly compressible from the tail end of the helix body 101.

FIG. 3 illustrates a partial sectional view of the joint between the spring suspension clip 100 and the threaded rod member 105. The partial sectional view in FIG. 3, shows how the threaded section 109 of the threaded rod member 105 is conformed within the helical body 101 of the spring suspension clip 100. In an embodiment, the height of the suspension of the threaded rod member 105 can also be adjusted by rotating the spring suspension clip 100 along the threaded section 109 of the threaded rod member 105.

The foregoing examples have been provided merely for the purpose of explanation and are in no way to be construed as limiting of the present concept disclosed herein. While the concept has been described with reference to various embodiments, it is understood that the words, which have been used herein, are words of description and illustration, rather than words of limitation. Further, although the concept has been described herein with reference to particular means, materials, and embodiments, the concept is not intended to be limited to the particulars disclosed herein; rather, the concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the concept in its aspects.

I claim:

1. A spring suspension clip for maintaining a space around a threaded rod in a predetermined position in a space in a rock defined by a boundary and to be filled with grout, comprising:
   a) a helix body;
   b) a head compressor; and
   c) a tail compressor;
   wherein said helix body has a head end;
   wherein said helix body has a tail end;
   wherein said helix body has a longitudinal axis;
   wherein said helix body is steadily threaded onto said threaded rod; and
   wherein said head compressor extends axially, downwardly, and outwardly compressible relative to the longitudinal axis of the helix body from said head end of said helix body and said tail compressor extends axially, downwardly, and outwardly compressible relative to the longitudinal axis of the helix body from said tail end of said helix body and said head compressor and said tail compressor are substantially diametrically opposite in position to each other on the helix body, so as to allow said head compressor and said tail compressor to compress against, and grab, the boundary of the space in the rock to thereby maintain the space around, and suspend, the threaded rod in the predetermined position in the space in the rock to be filled with the grout.

2. The spring suspension clip of claim 1, wherein said helix body has a width;
   wherein said helix body has a length; and
   wherein said width of said helix body is identical along said length of said helix body.

3. The spring suspension clip of claim 1, wherein the threaded rod has a threaded section; and
   wherein said helix body conforms to the threaded section of the threaded rod so as to allow the helix body to thread onto the threaded section of the threaded rod.

4. The spring suspension clip of claim 1, wherein the threaded rod has a height; and
   wherein said helix body is rotatably along the threaded section of the threaded rod so as to adjust the height of the threaded rod.

* * * * *